May 30, 1933.  G. W. ALLEN  1,912,114

CLAMP

Filed June 3, 1931

Witness
Paul F. Bryant

Inventor
George W. Allen
by his attorneys

Patented May 30, 1933

1,912,114

UNITED STATES PATENT OFFICE

GEORGE W. ALLEN, OF HYDE PARK, MASSACHUSETTS, ASSIGNOR TO B. F. STURTEVANT COMPANY, OF HYDE PARK, MASSACHUSETTS, A CORPORATION OF MASSACHUSETTS

CLAMP

Application filed June 3, 1931. Serial No. 541,813.

The present invention relates to clamps and particularly to clamps adapted to embrace a cylindrical surface.

The object of the present invention is to provide a simple, inexpensive, and easily operated clamp useful, for example, in clamping the inlet sleeve of a vacuum cleaner dust bag to a tube.

With this object in view, the present invention consists of the clamp hereinafter described and particularly defined in the claim.

Figure 1:
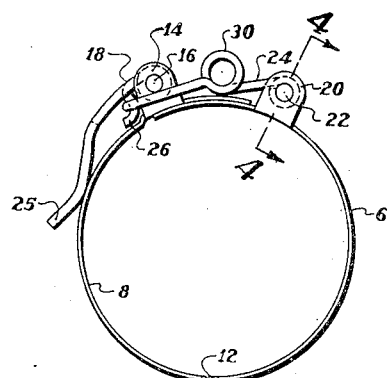
Figure 4:
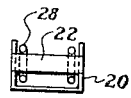
Figure 5:
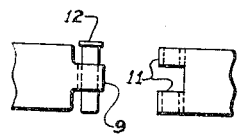
Figure 2:
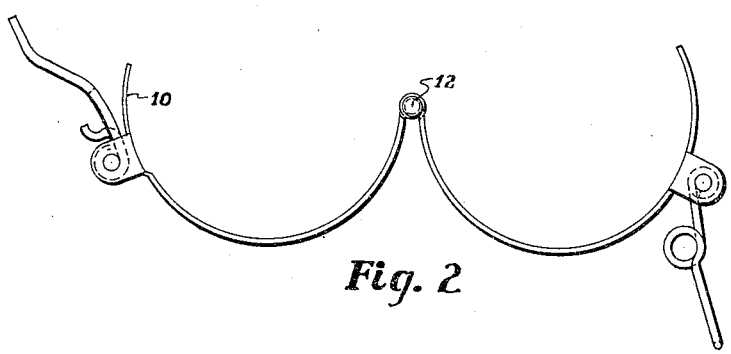
Figure 3:
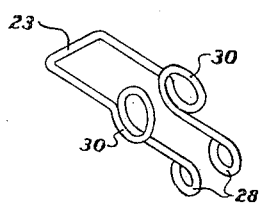

Referring to the accompanying drawing illustrating my invention in its preferred form, Fig. 1 illustrates the clamp in closed position; Fig. 2 is a view of the clamp in open position; Fig. 3 is a view in perspective illustrating the resilient clamping means; Fig. 4 is a section on the line 4—4 of Fig. 1; and Fig. 5 is a view in elevation showing the hinge between the clamping members in unassembled position.

The illustrated embodiment of the invention comprises two flexible metal clamping members 6 and 8, each of generally semi-cylindrical shape, one end of the member 8 adapted to overlie a portion of the member 6 when the clamp is closed, and to that end having an end portion 10 with a radius greater than the radius of the main portion by the thickness of the clamping member 6. The other end of the clamping member 8 has a narrow extension or tongue bent downwardly and backwardly to form the pin engaging loop 9. The clamping member 6 has two such extensions or tongues bent downwardly and backwardly to form the pin engaging loops 11, said loops 11 being adapted to receive between them the pin engaging loop 9 formed in the clamping member 8. The pin 12 is passed through said loops to form the hinge pin upon which said clamping members open and close. The clamping member 8 has upturned ears 14 positioned on opposite sides of the surface 8 to receive a pin 16 having a locking lever 18 mounted thereon. The clamping member 6 has similar upturned ears 20 adapted to receive a pin 22 to support thereon a resilient connector 24. The locking lever 18 consists of a metal strip formed into a loop at one end thereof to embrace the pin 16 and bent into the shape shown in Fig. 1 to provide a convenient manually operated handle end 25. The locking lever has a tongue 26 struck out from the body of the lever and bent to form a hook-shaped cam member adapted to engage the free end 23 of the resilient member 24. The resilient member 24 is constructed as a loop of spring wire, the ends thereof being formed at 28 to loosely embrace the pin 22. The connector 23 is made resiliently extensible by means of the coils 30 positioned between its free end 23 and the loops 28. If it is desired to increase the resilience of the member 24, this result may be accomplished by increasing the number or size of coils until the necessary resilience is secured.

In operation, the clamp members are placed around the object to be clamped, the end 25 of the lever 18 is passed through the loop formed by the resilient connector 24, and then the lever is snapped into the position of Fig. 1. In snapping down the lever, the end 23 of the connector is positioned by the tongue 26 and is carried over the ears 14 and past (i. e. inwardly beyond) the center of the pivot 16. The tension of the spring connector, therefore, not only draws the clamp members together, but also exerts a pull on the tongue 26 to lock the lever 18 in closed position. The clamp may be quickly released, merely by pressing outwardly on the end of the lever. The clamping pressure being produced by the tension of the spring connector, the clamping members are inextensible but are sufficiently flexible to accommodate themselves to the surface of the object being clamped.

Having thus described the invention what is claimed is:

A clamp comprising two resilient circularly curved bands pivotally connected at one end and provided each with a pair of integral, oppositely disposed, upstanding ears adjacent the ends of the bands, a yielding extensible connection pivoted between the ears of one band for detachably connecting together the free ends of said bands, and a lever pivoted between the ears of the other band and provided with a catch to engage the connection.

In testimony whereof I have signed my name to this specification.

GEORGE W. ALLEN.